United States Patent [19]

Ito et al.

[11] Patent Number: 5,389,268

[45] Date of Patent: Feb. 14, 1995

[54] FILTER AID INCLUDING SPECIFIC SILICA GEL

[75] Inventors: Mutsuhiro Ito; Nobuki Watanabe, both of Hyuga; Sakio Takahashi, Yokohama; Yuji Takahashi, Narashino, all of Japan

[73] Assignees: Fuji Silysia Chemical Ltd.; Kirin Brewery Kabushiki Kaisha, Japan

[21] Appl. No.: 137,825

[22] Filed: Oct. 15, 1993

[51] Int. Cl.⁶ .............................................. B01D 39/06
[52] U.S. Cl. .................................... 210/777; 210/193; 210/502.1
[58] Field of Search .................. 210/502.1, 651, 505, 210/193, 777, 778; 426/423

[56] References Cited

U.S. PATENT DOCUMENTS 3,996,131 12/1976 Conn .................................... 210/651

OTHER PUBLICATIONS

Harville et al. U.S. Statutory Invention Registration, H 89, Jul. 1, 1986.

Primary Examiner—Frank Spear
Attorney, Agent, or Firm—Davis, Bujold & Streck

[57] ABSTRACT

The present invention provides a novel filter aid which has excellent filtration properties and forms a stable cake layer on a filter member. The filter aid includes a flake-like, scale-like, or rod-like silica gel as a primary component thereof. The silica gel is approximately 5 through 100 micrometer in grain diameter and has a pore volume of approximately 0.2 through 1.5 ml/g and a specific surface area of approximately 100 through 1,000 m²/g.

6 Claims, 2 Drawing Sheets

FILTER AID INCLUDING SPECIFIC SILICA GEL

BACKGROUND OF THE INVENTION

1. Field of the Invention

The present invention relates to a novel filter aid, and more specifically to a filter aid including a specific silica gel as a primary component.

2. Description of the Related Art

Filter aids are generally used to reduce the filtration resistance and prevent clogging of a filter member in order to obtain a filtrate with high clarity by adsorbing or containing solid or colloidal substances in slurry.

In a pre-coat method, a filter aid forms a cake layer of 1 through 2 millimeter thick on a filter member to separate solid substances from slurry.

Typical examples of commonly used filter aids include diatomite, pearlite, and cellulose. These conventional filter aids have several drawbacks as difficulty in waste treatment and inability of eliminating water soluble proteins, which deposit as precipitate and decrease the clarity of the filtrate.

SUMMARY OF THE INVENTION

One object of the invention is to provide a novel filter aid having a relatively large pore volume and specific surface area.

Another object of the invention is to provide a filter aid which is safe and easily processed after use.

A further object of the invention is to provide a filter aid which efficiently adsorbs water soluble proteins and forms a stable cake layer.

The above and the other related objects are realized by a filter aid of the invention which includes a flake-like, scale-like, or rod-like silica gel as a primary component thereof. The silica gel is approximately 5 through 100 micrometer in grain diameter and has a pore volume of approximately 0.2 through 1.5 ml/g and a specific surface area of approximately 100 through 1,000 m$^2$/g.

These and other objects, features, aspects, and advantages of the present invention will become more apparent from the following detailed description of the invention with the accompanying drawings.

DETAILED DESCRIPTION OF THE PREFERRED EMBODIMENTS

Figure 1:
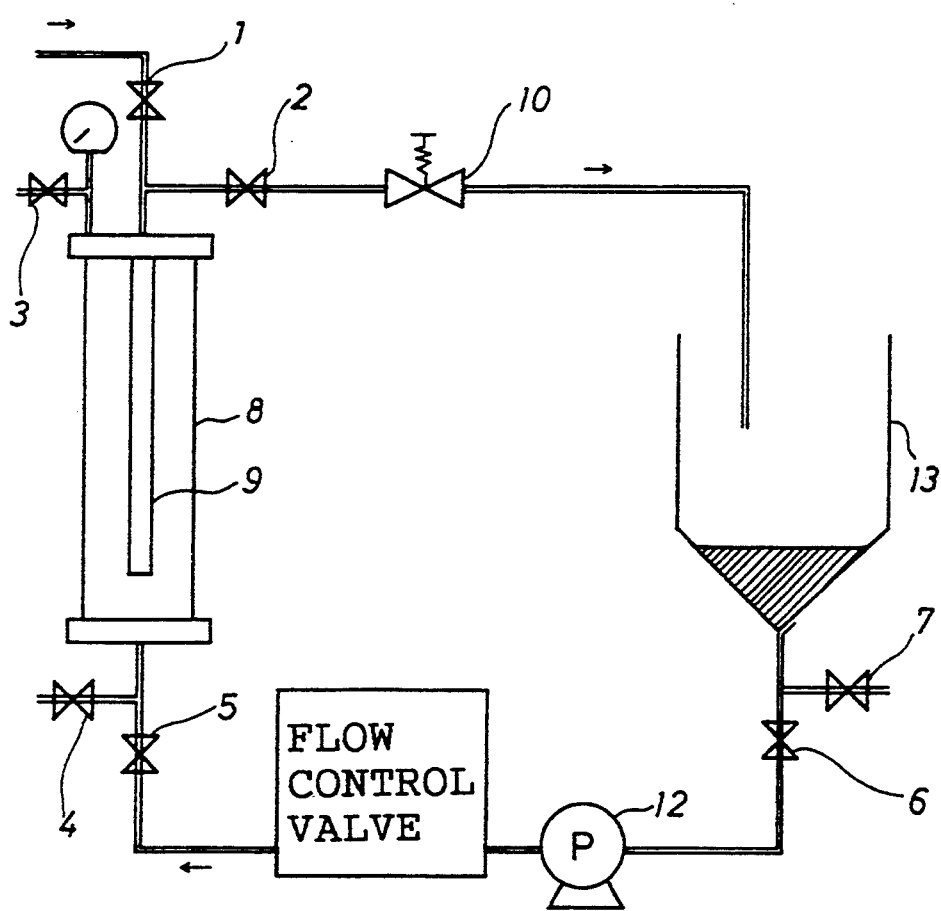
FIG. 1 shows a system used in an experiment of Example 1.

The filter aid of the invention includes a flake-like, scale-like, or rod-like silica gel as a primary component thereof. The silica gel is approximately 5 through 100 micrometer in grain diameter and has a pore volume of approximately 0.2 through 1.5 ml/g and a specific surface area of approximately 100 through 1,000 m$^2$/g.

The novel flake-like, scale-like, or rod-like silica gel with a relatively large pore volume and specific surface area according to the invention not only has effects equivalent to those of conventional filter aids but forms a stable cake layer owing to its specific shape. Particles of the silica gel are classified in shape according to the ratio of the shortest length to the middle length and the longest length (=x:y:z). The ratio x:y:z is equal to 1: not less than 3: not less than 5 in flake-like silica gel, 1: not less than 2: not less than 3 in scale-like silica gel, and 1: not less than 1: not less than 3 in rod-like silica gel.

When the grain diameter is smaller than 5 micrometer, a large filtration resistance undesirably reduces the flow of a sample solution. When the grain diameter is greater than 100 micrometer, on the other hand, a large sedimentation rate causes non-uniform or uneven formation of a cake layer on a filter material. Large grains also prevent the sample solution from being sufficiently filtered. When the pore volume is not greater than 0.2 ml/g, the large specific gravity and sedimentation rate cause non-uniform or uneven formation of a cake layer on a filter material. The silica gel having the pore volume of not less than 1.5 ml/g, on the contrary, has an insufficient strength to form a stable cake layer. A mean pore diameter is determined according to the relationship between the specific surface area and the pore volume as expressed below:

Equation 1

Mean Pore Diameter (Å)=40,000×Pore Volume (ml/g)/Specific Surface Area (m$^2$/g)

The mean pore diameter greatly affects adsorption of sedimented substances in a sample solution and is preferably between 8 and 600 angstrom. Since the favorable range of the pore volume is 0.2 through 1.5 ml/g as mentioned above, the specific surface area is preferably 100 through 1,000 m$^2$/g and more specifically 300 through 1,000 m$^2$/g. When the specific surface area is 300m$^2$/g or larger, the pore diameter becomes 200 angstrom or less, thereby effectively adsorbing the sedimented substances in the sample solution. The silica gel of the invention has a flake-like, scale-like, or rod-like shape as stated above. Silica gel of another shape, for example, crushed or spherical, does not have a sufficient adhesion strength and falls off a filter material.

The silica gel used in the invention is obtained according to the following steps: (1) freezing a silicate sol, where frozen silicates deposit in spaces between precipitated solvent crystals to form flake-like, scale-like, or rod-like frozen silica hydrogel; (2) defrosting the frozen silica hydrogel; (3) hydrothermally polymerizing the defrosted silica hydrosol; and (4) drying the polymerized silica hydrogel.

EXAMPLES

Example 1

First, a silicate sol (pH 3.0; sol concentration 13.0 percent by weight) prepared through a reaction of sodium silicate with an excessive amount of sulfuric acid was abruptly frozen in a freezer at −20° C. for freezing gelation.

Second, frozen silica hydrogel obtained was taken out of the freezer and placed in a heating vessel for defrosting and hydrothermal polymerization. The hydrothermal polymerization was carried out for three hours at PH of 5.0 and at the temperature of 30° C. The resulting physical properties were various because the freezing conditions like PH and temperature slightly change.

Third, the polymerized silica hydrogel was dried with a flash dryer to contain water of 6.0 percent by weight.

The silica gel thus produced was 20.3 micrometer in grain diameter and had a scale-like shape, the pore volume of 0.3 ml/g, and the specific surface area of 438 m²/g.

A first filtration test described below was conducted using the silica gel of Example 1 as a filter aid.

Experimental

A candle filter was pre-coated with each sample. The clarity of each sample solution, the adhesion strength of a filter aid cake formed on a filter member, and the filtration pressure were measured with a system shown in FIG. 1 during water flow, after stopping the water flow, and during drainage of water.

Measurement Steps (1) Valves 1 and 4 are opened to wash a filter member 9 while other valves 2, 3, and 5 are closed.

(2) The valve 4 is closed after sufficient washing of the filter member 9, and the valve 3 is subsequently opened. The valves 1 and 3 are closed after the column 8 is free of air and totally filled with water.

(3) A pump 12 is activated to circulate a predetermined amount of water in a tank 13 under the conditions of closing the valves 1, 3, 4, and 7 and opening the valves 2, 5, and 6. The column pressure is regulated to be equal to 0.5 kg/cm² with a back pressure regulating valve 10.

(4) At each time one sample is added to water in the tank 13 for pre-coating.

(5) After forty-minute circulation of water, the pump 12 is deactivated, and the valves 5 and 2 are closed.

(6) At each time one sample is stood five minutes, where the column pressure becomes equal to 0.3 kg/cm².

(7) The valve 3 is opened to remove the residual pressure in the column 8.

(8) The valve 4 is opened to drain water in the column 8.

Details of the System

Column Element: Composed of poly(vinyl chloride) (hereinafter referred to as PVC), partly transparent PVC
Inner Diameter: 105 mm
Inner Height: 715 mm
Inner Volume: 5850 ml
Chamber Element: Composed of SUS 304
Inner Volume: 2350 ml
Candle Filter: Composed of SUS
Number of Filters: 1
Type of Filter: Wire
Length of Filter Element: 500 mm
Mesh Size: 50 μm
Outer Diameter of Filter Element: 30 mm
Effective Filtration Area: 0.0471 m²
Pump Flow: 1,360 ml/min
Back Pressure: 0.5 kg/cm²
Pre-coat Flow: 1730 l/h·m²

Example 2

A silica gel of Example 2 was obtained in the same manner as that of Example 1 except that the silicate sol was frozen at −50° C. in Example 2.

The silica gel thus produced had a rod-like shape, the pore volume of 0.6 ml/g, and the specific surface area of 300 m²/g.

The silica gel of Example 2 was also tested in the same manner as Example 1.

Reference 1

The first filtration test stated as in Example 1 was conducted for a commercially available silica gel (mean grain diameter: 13.0 μm, specific surface area: 600 m²/g, pore volume: 1.30 ml/g, shape: crushed).

Reference 2

The first filtration test was conducted in the same manner as Example 1 for a commercially available diatomite.

Reference 3

The first filtration test was conducted in the same manner as Example 1 for another commercially available diatomite.

Reference 4

The silica gel of Example 1 was classified in size, and the first filtration test was conducted for the classified silica gel having the mean grain diameter of 4.0 μm.

Results of the first filtration test for Examples 1 and 2 and References 1 through 4 are shown in Table 1.

TABLE 1

| | REFERENCE 1 | REFERENCE 2 | REFERENCE 3 | REFERENCE 4 | EXAMPLE 1 | EXAMPLE 2 |
| --- | --- | --- | --- | --- | --- | --- |
| CLARITY (time) | WITHIN 15 MIN. | WITHIN 10 MIN. | WITHIN 10 MIN. | WITHIN 20 MIN. | WITHIN 10 MIN. | WITHIN 10 MIN. |
| DIFFERENTIAL PRESSURE IN COLUMN kg/cm² (after 40 minute-water circulation) | 1.10 | 0.50 | 0.25 | NOT LESS THAN 3.0 | 0.30 | 0.35 |
| 5 MIN. AFTER DEACTIVATION OF PUMP | GOOD | FINE PARTICLES ON THE SURFACE FALLING OFF | FINE PARTICLES ON THE SURFACE FALLING OFF | GOOD | GOOD | GOOD |
| ON WATER DRAINAGE | ½ FALLEN OFF | ½ FALLEN OFF | ½ FALLEN OFF | NO FALL-OFF | NO FALL-OFF | NO FALL-OFF |
| DARCY | 0.09 | 0.35 | 1.45 | NOT GREATER THAN 0.01 | 0.90 | 0.86 |

In Table 1, the clarity and DARCY efficient were determined as stated below.

Clarity

The clarity was expressed as a time period between addition of a filter aid slurry to the column and disappearance of turbidity in the column. The smaller figure shows the higher clarity rate.

DARCY (Filtration Characteristic)

A sample/water slurry of 20 g/500 ml was added to a column (6.0 cm×25 cm high) having a stainless filter member (325 mesh) and then sucked at 40 cmHg. The DARCY efficient was determined based on a filtration time during which the volume of the slurry was reduced from 350 ml to 100 ml.

Equation 2

DARCY = Thickness of Cake×250 ml (Volume of Filtered Solution)×76 cmHG (Atmospheric Pressure)×Viscosity of Water/Filtration Time×Cross Sectional Area×Suction Pressure (cmHg)

The greater figure of the DARCY efficient shows the better filtration effects.

The silica gel of Example 1 formed a stable cake layer on a filter member and had a relatively small differential pressure and a sufficient strength. Namely, the filter aid of Example 1 had properties superior to diatomite commonly used as a filter aid. Reference 1 had an undesirably large differential pressure and an unstable cake layer partly fallen off on water drainage. In References 2 and 3, particles continuously fell off the surface of the cake layer after deactivation of the pump and part of the cake layer was fallen off on water drainage. Reference 4 had an undesirably large differential pressure.

Example 3

Silica Gels A and B shown in Table 2 were produced in the same manner as Example 1. However, the hydrothermal polymerization was carried out for ten hours at PH of 6.0 and at the temperature of 60° C. The resulting physical properties were various because the freezing conditions like PH and temperature slightly change.

TABLE 2

| | SILICA GEL A | SILICA GEL B | CELLULOSE A | DIATOMITE B | DIATOMITE C | SILICA GEL C |
|---|---|---|---|---|---|---|
| GRAIN DIAMETER ($\mu$m) | 21.5 | 20.2 | DIAMETER: 15 THROUGH 20 $\mu$m LENGTH: 50 THROUGH 100 $\mu$m (measured under the microscope) | 10 | 20 | 13 |
| DARCY | 1.34 | 1.00 | 3.2 | 0.30 | 1.50 | 0.1 |
| SPECIFIC SURFACE AREA ($m^2$/g) | 820 | 592 | ~0 | ≈2 | ≈1 | 600 |
| PORE VOLUME (ml/g) | 0.72 | 0.73 | ~0 | ~0 | ~0 | 1.30 |
| SHAPE | MIXTURE OF SCALE-LIKE AND ROD-LIKE PARTICLES | | FIBER-LIKE PARTICLES | MIXTURE OF FIBER-LIKE AND DISC-LIKE PARTICLES | | CRUSHED |
| PROTEIN ABSORPTION ABILITY (%) | 79 | 87 | 5 | 0 | 5 | 94 |

Figure 2:
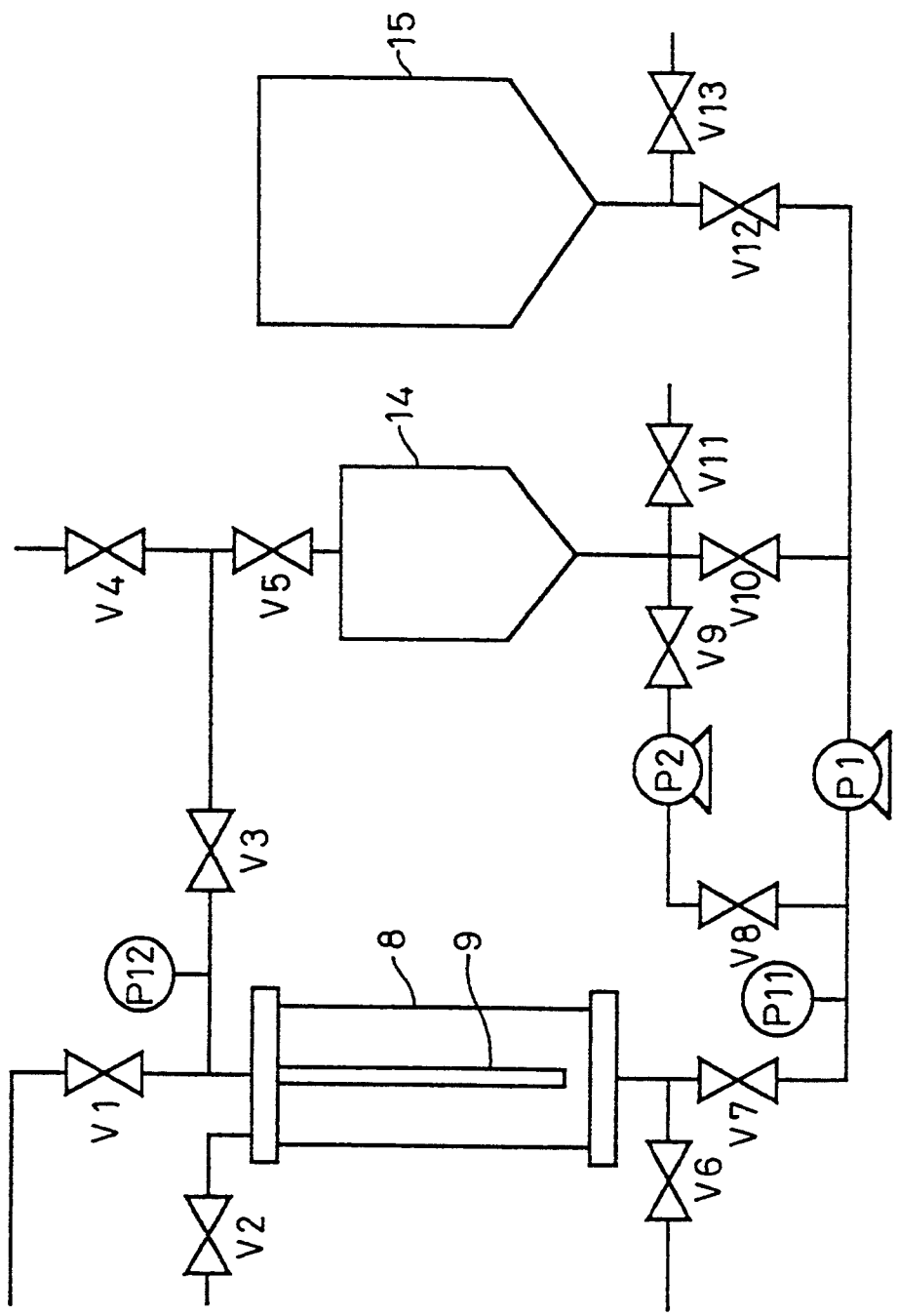
FIG. 2 shows a system used in an experiment of Example 3.

A second filtration test with a system shown in FIG. 2 was conducted for Silica Gels A and B used as filter aids.

Experimental

In this second filtration test with a candle filter 9, filtration properties including the pressure loss and the adhesion strength of the filter aid cake as well as the ability of adsorbing proteins in beer were determined according to the steps below.

(1) The column 8 is filled with water after the whole system is sufficiently washed.

(2) Silica Gel A (filter aid) is added to a dosing tank 14, mixed with water, and circulated in the system with a filtration pump P1 activated and valves V3, V5, V7, and V10 open for a first pre-coat.

(3) After completion of the first pre-coat, Silica Gels A and B (filter aids) are processed in the same manner as step (2) for a second pre-coat.

(4) After completion of the second pre-coat, body-feed filter aids (Silica Gels A and B) are added to and mixed with water.

(5) Non-filtered beer is fed from a solution tank 15 into a filter device at a constant pressure of 2 kg/cm² with the filtration pump P1 activated and valves V3, V4, V7, and V12 open while body feed starts with a dosing pump P2 activated and valves V8 and V9 open.

(6) Filtration is continued at a constant flow of 0.5 kl/hr/m². After the filter device is completely filled with beer, the filtered beer is collected.

(7) After completion of the filtration, the residual pressure in the column 8 is drawn out with a valve V2 open and the beer solution is drained with a valve V6 open.

Details of the System

Column Element: Composed of pressure glass
Inner Diameter: 196 mm
Inner Height: 930 mm
Candle Filter: Composed of SUS
Number of Filters: 3
Type of Filter: Sintered metal
Length of Filter Element: 500 mm
Outer Diameter of Filter Element: 30 mm
Effective Filtration Area (Total of three filters): 0.219 m²

Method of Measuring Protein Adsorption Ability

Turbidity of beer is generally observed with elapse of time, but can be estimated with SASPL (saturated ammonium sulfate precipitation limit) values obtained by salting-out titration with ammonium sulfate.

In SASPL determination, diatomite is first added to non-stabilized young beer, and the mixed beer solution is filtered for removal of yeasts. After addition of a silica gel, the beer solution is stirred with a magnetic stirrer for a predetermined time period. Immediately after the stirring, the beer solution is passed through a membrane filter for removal of the silica gel. SASPL values of the filtered beer solution are then determined by salting-out titration with ammonium sulfate.

A protein adsorption ability SI (%) expressed as below represents an estimation of stabilization effects of beer.

Equation 3

Protein Adsorption Ability SI=(S-B)/(C-B)×100 in which S, B, and C respectively show an SASPL vale of processed beer with a silica gel sample, an SASPL value of non-processed beer, and an SASPL value of processed beer with a reference silica gel.

The greater figures of SASPL and SI values show the higher ability of adsorbing proteins.

The reference silica gel used as a control was sold under the trade namer of Sylopute by Fuji Davison Chemical (currently named Fuji Silysia Chemical).

Reference 5

The second filtration test was conducted for commercially available filter aids shown in Table 2, that is, Cellulose A, Diatomites B and C, Silica gel C (proved to have protein adsorption ability, in the same manner as Example 3. In this experiment, Cellulose A was used for a first pre-coat, Diatomites B and C for a second pre-coat, and Diatomites B and C and Silica Gel C for body feed. Cellulose is generally used to enhance the strength of a pre-coat layer, a plurality of diatomites to control filtration accuracy and rate, and Silica Gel C to improve the turbid stability of beer.

The following are results of the experiment for Example 3 and Reference 5.

Both Example 3 (Silica Gels A and B) and Reference 5 (Cellulose A, Diatomites B and C, and Silica Gel C) had desirable filtration properties including the pressure loss and the adhesiveness and strength of the filter aid cake. It was also proved that Silica Gels A and B did not affect the quality of filtered beer at all.

The protein adsorption ability of the above filter aids are shown in Table 2 with respect to 100% protein adsorption ability of the reference silica gel. Silica Gels A, B, and C had significant protein adsorption ability while the other filter aids did not.

As described above, the filter aids of the examples primarily composed of silica gel having specific properties have excellent filtration properties.

Since there may be many modifications, alternations, and changes without departing from the scope of the invention, it is clearly understood that the above examples are only illustrative and not restrictive in any sense.

What is claimed is:

1. A filter aid, for absorbing protein, comprising silica gel as a primary component thereof, and said silica gel including flake-like silica gel, scale-like silica gel, and rod-like silica gel;
    wherein said silica gel are classified by shape according to a ratio of a shortest length to a middle length to a longest length, and the ratio of said flake-like silica gel is 1: not less than 3: not less than 5; the ratio of said scale-like silica gel is 1: not less than 2: not less than 3; and the ratio of said rod-like silica gel is 1: not less than 1: not less than 3.

2. A filter aid according to claim 1, wherein said silica gel has a grain diameter of approximately 5 to 100 micrometers, has a pore volume of approximately 0.2 to 1.5 ml/g and a specific surface area of approximately 100 to 1,000 m$^2$/g.

3. A filter aid according to claim 2, wherein said silica gel has a specific surface area of approximately 300 to 1,000 m$^2$/g.

4. A filter aid according to claim 2, wherein said silica gel is produced by freezing a silicate sol to form frozen silica hydrogel, defrosting said frozen silica hydrogel, hydrothermally polymerizing the defrosted silica hydrogel, and drying said polymerized silica hydrogel.

5. A filter aid, for absorbing protein, comprising silica gel as a primary component thereof, and said silica gel including flake-like silica gel, scale-like silica gel, and rod-like silica gel; said silica gel being manufactured by freezing a silicate sol so that frozen silicates deposit in spaces between precipitated solvent crystals and thereby form flake-like silica hydrogel, scale-like silica hydrogel and rod-like silica hydrogel; defrosting the frozen silica hydrogels; hydrothermally polymerizing the defrosted silica hydrogels; and drying the polymerized silica hydrogels to obtain said flake-like silica gel, said scale-like silica gel and said rod-like silica gel;
    wherein said silica gel are classified by shape according to a ratio of a shortest length to a middle length to a longest length, and the ratio of said flake-like silica gel is 1: not less than 3: not less than 5; the ratio of said scale-like silica gel is 1: not less than 2: not less than 3; and the ratio of said rod-like silica gel is 1: not less than 1: not less than 3.

6. A method of manufacturing a filter aid, for absorbing protein, comprising silica gel as a primary component thereof, and said silica gel including flake-like silica gel, scale-like silica gel, and rod-like silica gel;
    said method comprising the steps of manufacturing said silica gel by freezing a silicate sol so that frozen silicates deposit in spaces between precipitated solvent crystals and thereby form flake-like silica hydrogel, scale-like silica hydrogel and rod-like silica hydrogel;
    defrosting the frozen silica hydrogels;
    hydrothermally polymerizing the defrosted silica hydrogels;
    drying the polymerized silica hydrogels to obtain said flake-like silica gel, said scale-like silica gel and said rod-like silica gel;
    classifying said silica gel by shape according to a ratio of a shortest length to a middle length to a longest length, with the ratio of said flake-like silica gel being 1: not less than 3: not less than 5; the ratio of said scale-like silica gel being 1: not less than 2: not less than 3; and the ratio of said rod-like silica gel being 1: not less than 1: not less than 3; and
    using said classified silica gel as said filter aid.

* * * * *